United States Patent
Qiu et al.

(10) Patent No.: US 9,713,016 B2
(45) Date of Patent: Jul. 18, 2017

(54) DENSE SMALL CELL DEPLOYMENT

(71) Applicant: Avago Technologies General IP (Singapore) Ptd. Ltd., Singapore (SG)

(72) Inventors: Xiaoxin Qiu, Basking Ridge, NJ (US); Guosen Yue, Edison, NJ (US); Sungeun Lee, East Brunswick, NJ (US); Hongwei Kong, Basking Ridge, NJ (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 171 days.

(21) Appl. No.: 14/755,031

(22) Filed: Jun. 30, 2015

(65) Prior Publication Data

US 2016/0286408 A1    Sep. 29, 2016

Related U.S. Application Data

(60) Provisional application No. 62/138,333, filed on Mar. 25, 2015.

(51) Int. Cl.
*H04W 16/32* (2009.01)
*H04J 11/00* (2006.01)

(52) U.S. Cl.
CPC ........... *H04W 16/32* (2013.01); *H04J 11/005* (2013.01)

(58) Field of Classification Search
CPC .............................. H04W 16/32; H04J 11/005
USPC ................ 455/63.1, 114.2, 278.1, 296, 446, 455/448–452.1
See application file for complete search history.

(56) References Cited

U.S. PATENT DOCUMENTS

| | | | |
|---|---|---|---|
| 2012/0108175 A1* | 5/2012 | Luo ....................... | H04L 5/0007 455/63.1 |
| 2013/0143541 A1* | 6/2013 | Henderson ............ | H04W 16/24 455/418 |
| 2014/0119332 A1* | 5/2014 | Kim ....................... | H04W 52/58 370/330 |
| 2015/0056989 A1* | 2/2015 | Lee ....................... | H04W 48/16 455/434 |
| 2016/0295418 A1* | 10/2016 | Yilmaz ................. | H04W 16/04 |

* cited by examiner

*Primary Examiner* — Michael Mapa
(74) *Attorney, Agent, or Firm* — Foley & Lardner LLP

(57) ABSTRACT

In some aspects, the disclosure is directed to methods and systems for dense small cell deployment. In one or more embodiments, a plurality of small cells is grouped into a first group of small cells having a first power level and a second group of small cells having a second power level. In one or more embodiments, each power level in the first set of power levels is greater than each power level in the second set of power levels. In one or more embodiments, the small cells of the first group performs frequency domain inter-cell interference coordination (ICIC) between the small cells of the first group. In one or more embodiments, the small cells of the second group performs time domain ICIC with the small cells in the first group. In one or more embodiments, the small cells of the first group use a same almost blank subframe (ABS) pattern.

20 Claims, 10 Drawing Sheets

DENSE SMALL CELL DEPLOYMENT

RELATED APPLICATIONS

This application claims priority to and the benefit of U.S. Provisional Patent Application No. 62/138,333, filed Mar. 25, 2015. The entire contents of the foregoing are hereby incorporated herein by reference for all purposes.

FIELD OF THE DISCLOSURE

This disclosure generally relates to systems and methods for implementing a network, including systems and methods for cell deployment.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.1x, Bluetooth, global system for mobile communications (GSM), code division multiple access (CDMA). As increased data throughput and other developments occur, updates and new standards are constantly being developed for adoption, such those associated with the third generation partnership project (3GPP).

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following standard(s) and specification(s), including any draft versions of such standard(s) and specification(s), are hereby incorporated herein by reference in their entirety and are made part of the present disclosure for all purposes: Long-Term Evolution (LTE); LTE-Advanced (LTE-A); and 3GPP. Although this disclosure can reference aspects of these standard(s) and specification(s), the disclosure is in no way limited to these aspects.

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for dense small cell deployment.

A. Computing and Network Environment

Figure 1A:
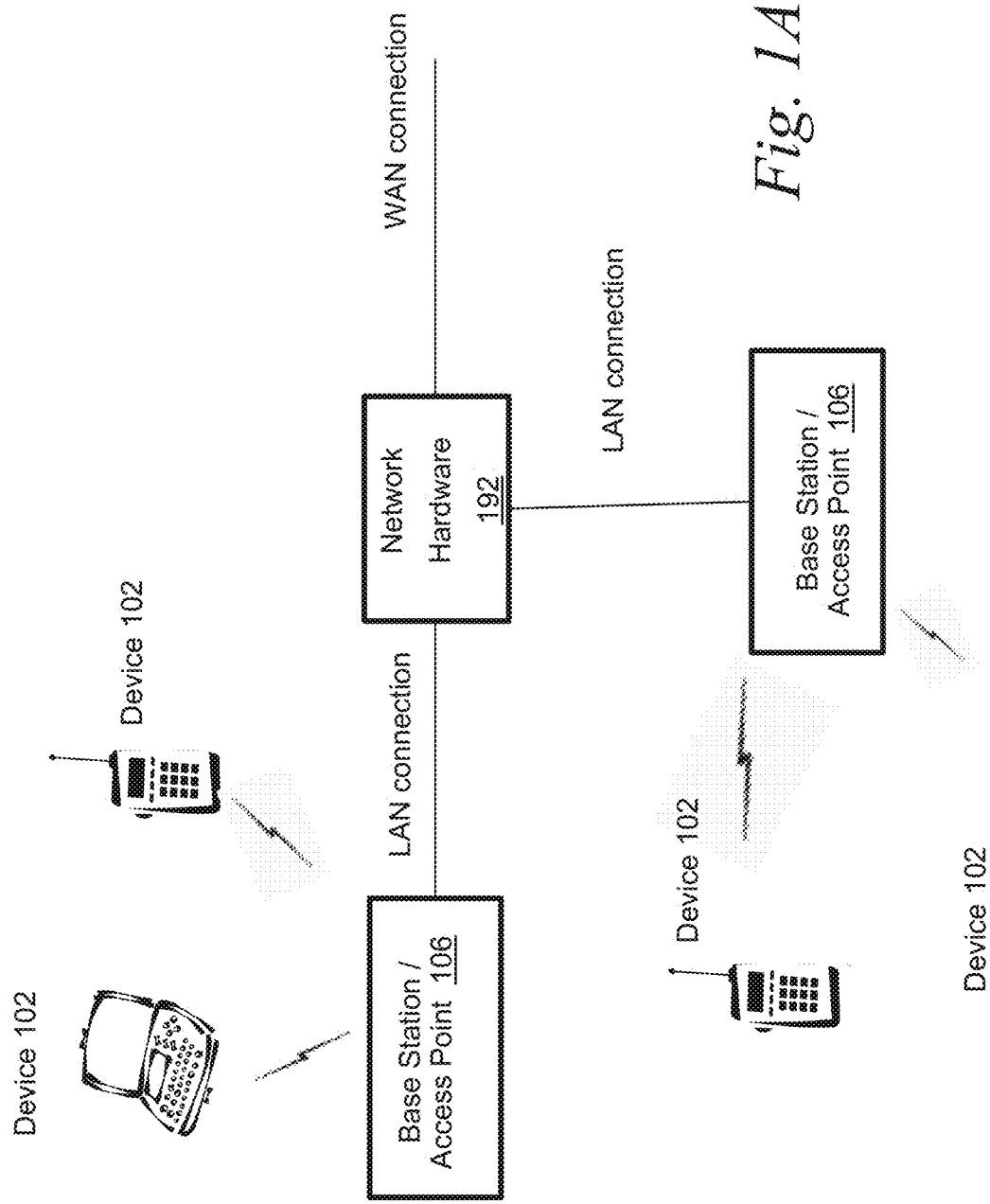
FIG. 1A is a block diagram depicting an embodiment of a network environment including one or more wireless communication devices in communication with one or more devices or stations.

Prior to discussing specific embodiments of the present solution, it might be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more base stations 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or base station are described in greater detail with reference to FIGS. 1B and 1C. The network environment can be an ad hoc network environment, an infrastructure wireless network environment, a subnet environment, etc., in one embodiment.

Terms such as "wireless communication device", "user equipment," "mobile station," "mobile," "mobile device," "subscriber station," "subscriber equipment," "access terminal," "terminal," "handset," and similar terminology, can refer to a wireless device utilized by a subscriber or user of a wireless communication service to receive or convey data, control, voice, video, sound, gaming, or substantially any data-stream or signaling-stream. The foregoing terms can be utilized interchangeably in the present disclosure. Likewise, terms such as "access point (AP)," "wireless access point (WAR)," "base station," "base transceiver station", "Node B," "evolved Node B (eNode B or eNB)," home Node B (HNB)," "home access point (HAP)," and similar terminology, can be utilized interchangeably in the present disclosure, and refer to a wireless network component or apparatus that serves and receives data, control, voice, video, sound, gaming, or substantially any data-stream or signaling-stream from a set of wireless devices.

Referring again to FIG. 1A, the base stations 106 can be operably coupled to the network hardware 192 via local area network connections. The network hardware 192, which can include a router, gateway, switch, bridge, modem, system controller, appliance, etc., can provide a local area network connection for the communication system. Each of the base stations 106 can have an associated antenna or an antenna array to communicate with the wireless communication devices 102 in its area. The wireless communication devices 102 can register with a particular access point 106 to receive services from the communication system (e.g., via a SU-MIMO or MU-MIMO configuration). For direct connections (e.g., point-to-point communications), some wireless communication devices 102 can communicate directly via an allocated channel and communications protocol. Some of the wireless communication devices 102 can be mobile or relatively static with respect to the access point 106.

In some embodiments, a base station 106 includes a device or module (including a combination of hardware and software) that allows wireless communication devices 102 to connect to a wired network using LTE, Wi-Fi, and/or other standards. A base station 106 can be implemented, designed and/or built for operating in a wireless local area network (WLAN), such as in a cellular network. A base station 106 can connect to a router (e.g., via a wired network) as a standalone device in some embodiments. In other embodiments, a base station can be a component of a router. A base station 106 can provide multiple devices 102 access to a network. A base station 106 can, for example, connect to a wired Ethernet connection and provide wireless connections using radio frequency links for other devices 102 to utilize that wired connection. A base station 106 can be built and/or implemented to support a standard for sending and receiving data using one or more radio frequencies. Those standards, and the frequencies they use can be defined by the IEEE or 3GPP for example. A base station 106 can be implemented and/or used to support cellular coverage, public Internet hotspots, and/or on an internal network to extend the network's signal (e.g., Wi-Fi) range.

In some embodiments, the base stations 106 can be used for (e.g., in-home or in-building) wireless networks (e.g., IEEE 802.11, Bluetooth, ZigBee, cellular, any other type of radio frequency based network protocol and/or variations thereof). Each of the wireless communication devices 102 can include a built-in radio and/or is coupled to a radio. Such wireless communication devices 102 and/or base stations 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more base stations 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
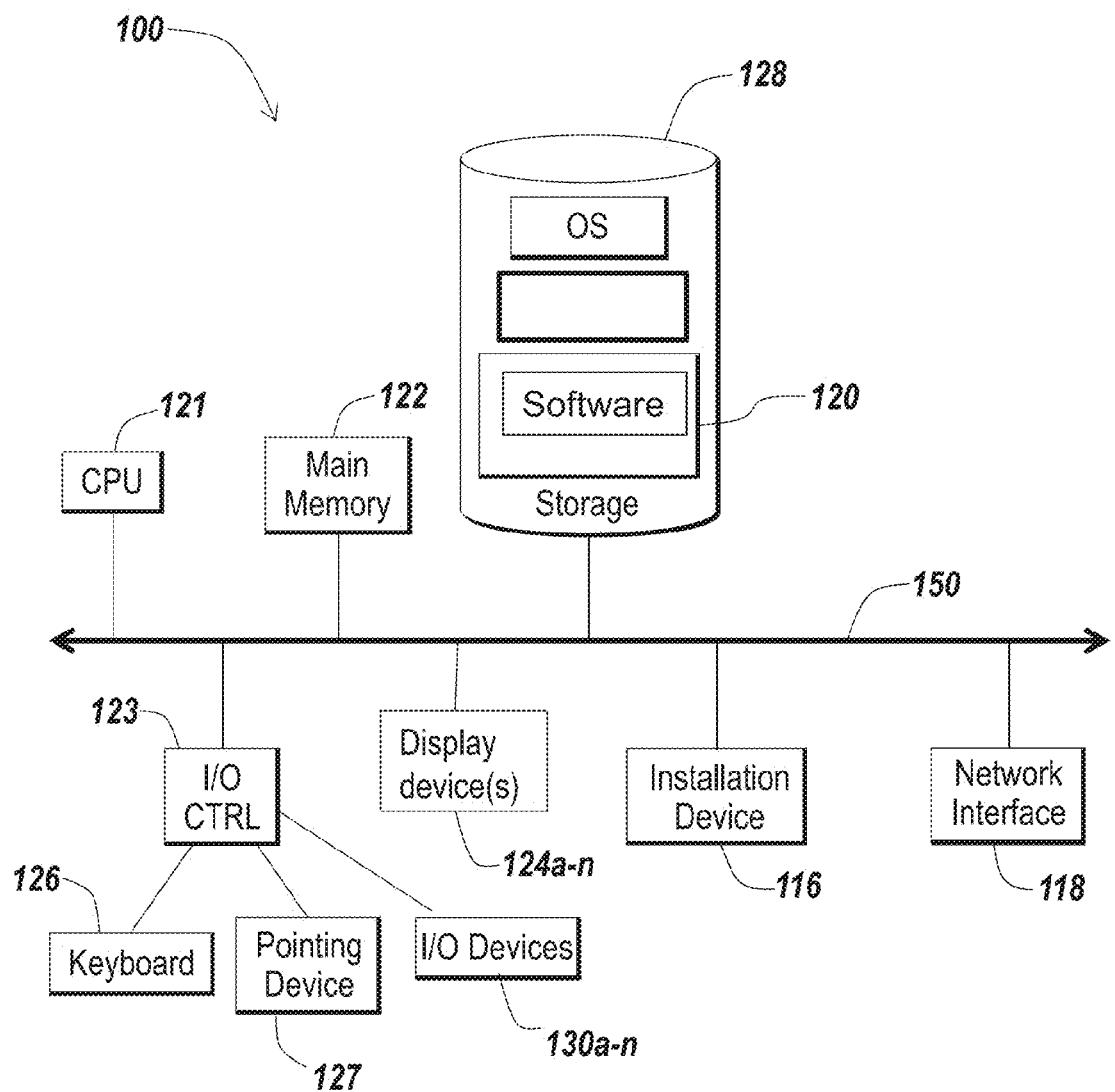
FIGS. 1B and 1C are block diagrams depicting embodiments of computing devices useful in connection with the methods and systems described herein.
Figure 1C:
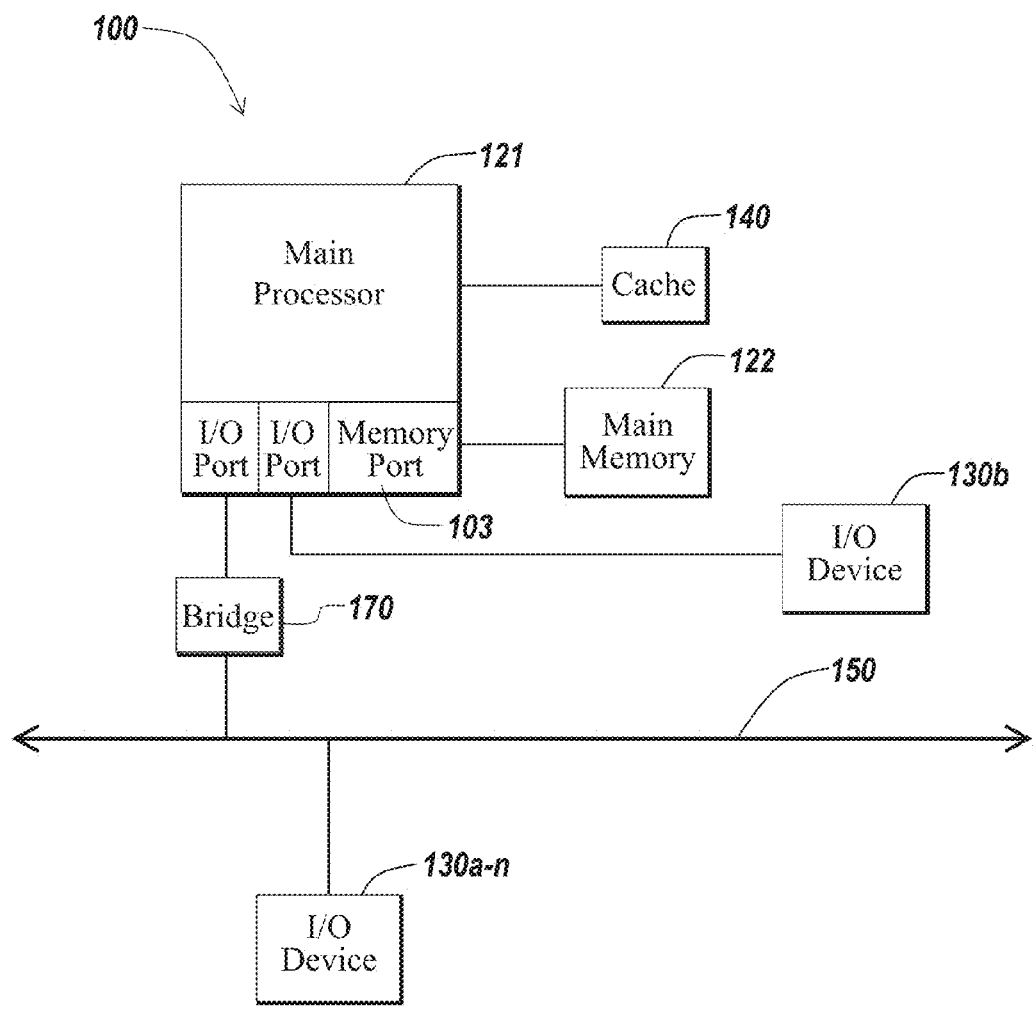

The communications device(s) 102 and base station(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the base station 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; those manufactured by ARM Holdings, plc of Cambridge, England. or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax, LTE, LTE-A and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be implemented for using multiple displays 124a-124n. One ordinarily skilled in the art will recognize and appreciate the various ways and embodiments that a computing device 100 can be implemented to have one or more display devices 124a-124n.

In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Dense Small Cell Deployment

Described herein are systems and methods for dense small cell deployment. In one or more embodiments, dense small cell deployment entails proper adjustment of downlink transmit power to trade-off interference between the small cells, mobility and/or coverage. In one or more embodiments, the present systems and methods manage interference between groups of small cells and/or between small cells and one or more associated macro cell. In one or more embodiments, the present systems and methods implements frequency domain and/or time domain interference management between groups of small cells and/or between small cells and one or more associated macro cell.

Small cells are sometimes referred to as femtocells and/or home eNodeBs (HeNBs). For example, in one or more embodiments, a HeNB is 3GPP's term for a LTE femtocell or small cell. In one or more embodiments, a femtocell is a small, low-power cellular base station, designed for use in a home or small business for example. In one or more embodiments, a term which is more widespread in use is small cell, with femtocell as a subset. In one or more embodiments, a small cell connects to a service provider's network via broadband (such as digital subscriber line or cable). In one or more embodiments, a femtocell allows service providers to extend service coverage indoors or at the cell edge, e.g., where access would otherwise be limited or unavailable. One or more of these terms (e.g., femtocell, small cell, HeNB) are sometimes used interchangeably herein.

In one or more embodiments, interference between the small cells are referred to as inter-cell or inter-HeNB interference. When two or more HeNBs are physically located close or proximate to each other within a geographic area for example, one HeNB dominates and the rest of the HeNBs operate at low transmit power levels, in one or more embodiments. This creates a co-channel heterogeneous network (HetNet) scenario, in one or more embodiments. In one or more embodiments, a HetNet scenario refers to an environment in which multiple types of access nodes (e.g., small cell, macro cell or base station) is used or operate simultaneously in a wireless network. In one or more embodiments, frequency domain inter-cell interference coordination (ICIC) is not very effective in this case. ICIC is a scheme or technology for reducing the interference created by neighbor cells, in one or more embodiments. In one or more embodiments, frequency domain ICIC between dominating HeNBs provides a good tradeoff for improving cell edge user experience. In one or more embodiments, the present system and methods implement a strategy that works with different deployment phases and/or scenarios.

In one aspect, the present disclosure is directed to a method for small cell deployment. In one or more embodiments, the method includes grouping a plurality of small cells into a first group of small cells having a first set of power levels and a second group of small cells having a second set of power levels. In one or more embodiments, each power level of the first set of power levels is greater than each power level of the second set of power levels. In one or more embodiments, the small cells of the first group perform frequency domain ICIC between the small cells of the first group. In one or more embodiments, the small cells of the first group perform time domain ICIC between the small cells of the second group and the small cells of the first group. In one or more embodiments, the small cells of the first group use a same almost blank subframe (ABS) pattern.

In one or more embodiments, a network service provider deploys the first group of small cells in a first phase, and deploys the second group of small cells in a second phase after the first phase. In one or more embodiments, the network service provider deploys the first group of small cells distributed over a desired geographical area, and deploys the second group of small cells within an identified portion of the desired geographical area. In one or more embodiments, the network service provider or one or more small cells of the first group identify the first portion of the desired geographical area as an area for adding service capacity. In one or more embodiments, the network service provider deploys a third group of small cells over a second portion of the desired geographical area. In one or more embodiments, the third group of small cells operates within the second set of power levels. In one or more embodiments, the network service provider deploys a third group of small cells over a second portion of the desired geographical area after deploying the first and second groups of small cells. In one or more embodiments, the network service provider deploys a macro cell to operate over at least a portion of the desired geographical area, and to operate on a carrier frequency different from that of the first group of small cells. In one or more embodiments, the method including the network service provider and/or one or more small cells configuring the first set of power levels to be separated from the second set of power levels by at least 20 dB.

In another aspect, the present disclosure is directed to a system for small cell deployment. In one or more embodiments, the system includes a first group of small cells having a first set of power levels. In one or more embodiments, the system includes a second group of small cells having a second set of power levels. In one or more embodiments, each power level of the first set of power levels is greater than each power level of the second set of power levels. In one or more embodiments, small cells of the first group perform frequency domain ICIC between the small cells of the first group. In one or more embodiments, small cells of the second group perform time domain ICIC with the small cells of the first group, the small cells of the first group using a same ABS pattern.

In one or more embodiments, the first group of small cells is deployed in a first phase, and the second group of small cells are deployed in a second phase. In one or more embodiments, the first group of small cells is deployed and distributed over a desired geographical area, and the second group of small cells are deployed within an identified portion of the desired geographical area. In one or more embodiments, the first portion of the desired geographical area is identified as an area for adding service capacity. In one or more embodiments, a third group of small cells is deployed over a second portion of the desired geographical area, and operates within the second set of power levels. In one or more embodiments, a third group of small cells is deployed over a second portion of the desired geographical area after deploying the first and second groups of small cells. In one or more embodiments, a macro cell operates over at least a portion of the desired geographical area, and operates on a carrier frequency different from that of the first group of small cells. In one or more embodiments, the first set of power levels is separated from the second set of power levels by at least 20 dB.

In another aspect, the present disclosure is directed to a method for small cell deployment. In one or more embodiments, the method includes deploying a first group of small cells over a desired geographical area. In one or more embodiments, the first group of small cells operates within a first set of power levels. In one or more embodiments, the first group of small cells performs, between the small cells of the first group, frequency domain ICIC. In one or more embodiments, a network service provider deploys a second group of small cells within a first portion of the desired geographical area, the second group of small cells operating within a second set of power levels. In one or more embodiments, each power level in the first set of power levels is greater than each power level in the second set of power levels. In one or more embodiments, the second group of small cells performs, between the small cells of the second group and the small cells of the first group, time domain ICIC. In one or more embodiments, the small cells of the first group using a same ABS pattern.

In one or more embodiments, a network service provider identifies the first portion of the desired geographical area as an area for adding service capacity. In one or more embodiments, a network service provider deploys a third group of small cells over a second portion of the desired geographical area, the third group of small cells operating within the second set of power levels. In one or more embodiments, the network service provider and/or one or more small cells configure the first set of power levels to be separated from the second set of power levels by at least 20 dB.

Figure 2A:
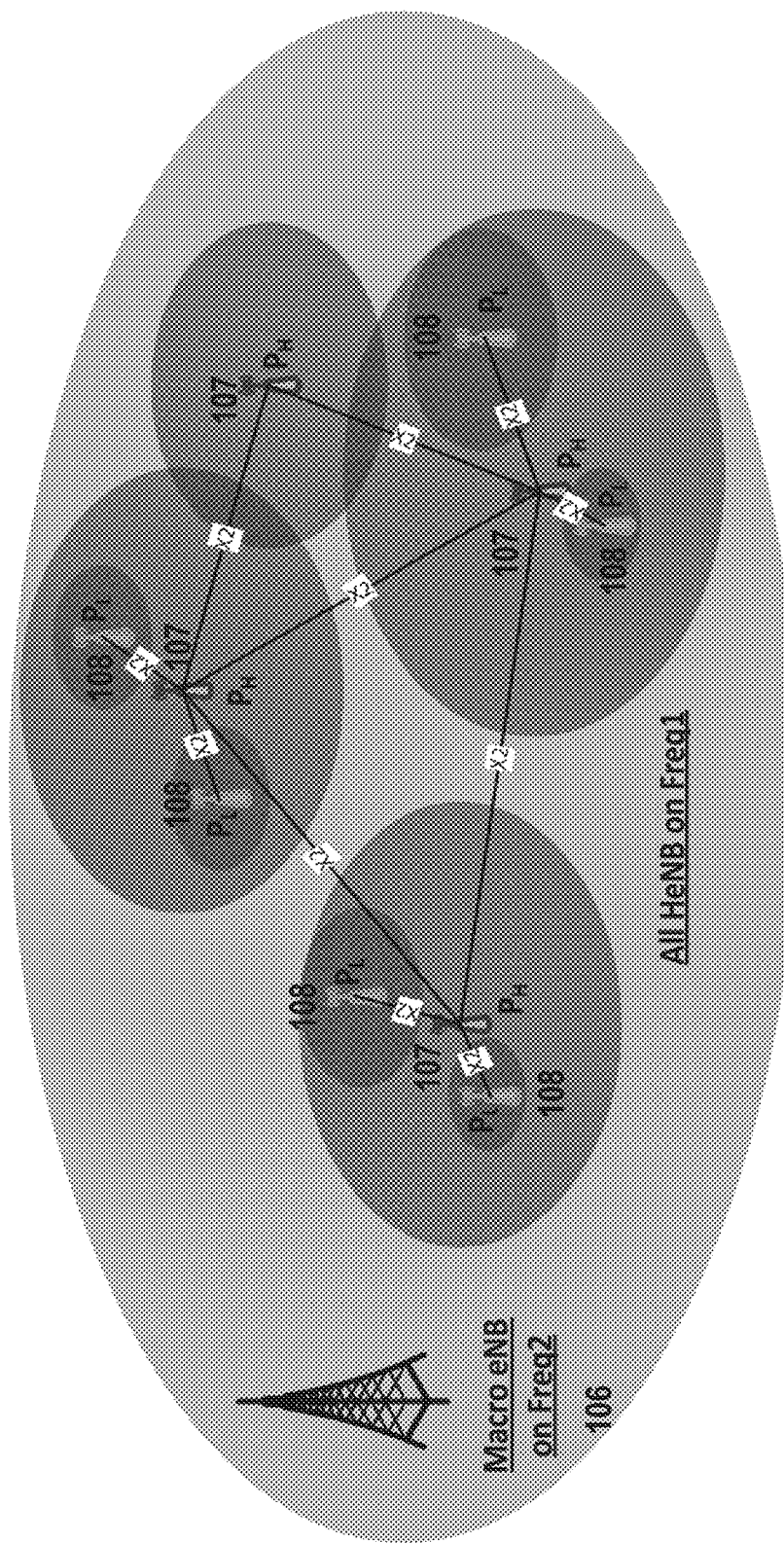
FIG. 2A is a diagram depicting one embodiment of a system for dense small cell deployment.

Referring to FIG. 2A, one example embodiment of a system for dense small cell deployment is depicted. The system includes a plurality of small cells 107, 108 in one or more embodiments, associated with at least one macro cell 106 or base station. In one or more embodiments, each small cell 107, 108 and/or the macro cell 106 include one or more features of the base stations 106 described above in connection with FIG. 1A. A first group or subset of the plurality of small cells includes small cells that are each assigned, or operating at a power level selected from a first set of power levels $P_H$. A second group or subset of the plurality of small cells includes small cells that are each assigned, or operating at a power level selected from a second set of power levels $P_L$. Each of the above-mentioned elements or entities is implemented in hardware, or a combination of hardware and software, in one or more embodiments. For instance, each of these elements or entities could include any application, program, library, script, task, service, process or any type and form of executable instructions executing on hardware of the device 102, in one or more embodiments. The hardware includes circuitry such as one or more processors, for example, as described above in connection with at least 1B and 1C, in one or more embodiments.

In one or more embodiments, the macro cell 106 is sometimes referred to as a macro eNB, or a partner macro eNB to the small cells 107, 108. In one or more embodiments, the macro cell 106 is deployed on a different carrier frequency that that of the small cells. This deployment strategy avoids or reduces interference, e.g., between signal communications of the macrocell 106 and that of the small cells 107, 108, in one or more embodiments. In one or more embodiments, inter-cell interference from macro cell 106 is not a concern for one or more of the small cells. In one or more embodiments, coverage, mobility and/or load balancing is managed between the macrocell 106 and/or one or more of the small cells 107, 108.

In one or more embodiments, the plurality of small cells are divided into two power groups (a first group and a second group), associated with the $P_H$ and the $P_L$ sets of power levels, based on the small cells' selected power levels. The present disclosure shall sometimes refer to the first group as the $P_H$ group, and the second group as the $P_L$ group. In one or more embodiments, power level selection follows transmit power control (TPM) algorithms, for example in a self-organizing network (SON). In one or more embodiments, TPM refers to intelligent transmit power control algorithms, that set a maximum transmit power of a small cell based on the small cell's radio environment, coverage requirements and/or mobility optimization criteria. In one or more embodiments, it is possible for the $P_H$ and $P_L$ sets of power levels to each include a single level or multiple levels of power. In one or more embodiments, the small cells 107, 108 employ and/or establish a connection or interface, such as an X2-interface available between the small cells 107, 108 to support ICIC, mobility robustness optimization (MRO) and/or load balancing.

In one or more embodiments, the power levels in the $P_H$ and $P_L$ sets are specified in the TPM algorithms, or via other means. In one or more embodiments, a small cell adopts, selects, negotiates for, or is implemented/assigned with a power level. In one or more embodiments, for a deployment (e.g., an initial deployment) with less density (e.g., geographically distributed and/or having minimal levels of interference), each group of small cells could be considered to operate at a single level, e.g., 20 dBm transmit (e.g., downlink) power in $P_H$ and, e.g., −7 dBm transmit power in $P_L$. An initial stage of the deployment deploys small cells operating at power level(s) in $P_H$. The initial stage deploys small cells distributed across a desired geographical area to provide coverage over the desired geographical area. In one or more embodiments, one or more subsequent stages of the deployment deploys small cells operating at power level(s) in $P_L$. For example, a subsequent stage deploys additional small cells (e.g., of lower power) over one or more portions (e.g., hotspots) of the desired geographical area to provide additional capacity.

In one or more embodiments, the difference between the minimum value/level in $P_H$ (e.g., 25, 20, 18, 15, 10 dBm) and the maximum value/level in $P_L$ (e.g., −15, −7, 0, 5 dBm) is significant or large (e.g., >20 dB, >10 dB, >30 dB, etc.). In one or more embodiments, the HeNBs in the $P_H$ or first group perform or implement ICIC between the HeNBs in the $P_H$ set or first group. In one or more embodiments, the HeNBs in the $P_H$ or first group perform or implement frequency domain ICIC between the HeNBs in the $P_H$ or first group. In one or more embodiments, the HeNBs in the $P_H$ or first group perform or implement time domain ICIC between the HeNBs in the $P_H$ or first group, and the HeNBs in the $P_L$ or second group. In some embodiments, one or more or all of the HeNBs in the $P_H$ group utilize a same almost blank subframe (ABS) pattern in order to support small cells from the $P_L$ or second group located in-between two small cells from the $P_H$ or first group for example. In this case, a small cell from the $P_L$ or second group sees interference from both the small cells from the $P_H$ or first group, in one or more embodiments.

In one or more embodiments, the HeNBs in the $P_L$ or second group perform or implement ICIC with the HeNBs in the $P_H$ or first group. In one or more embodiments, the HeNBs in the $P_L$ or second group perform or implement frequency domain ICIC with the HeNBs in the $P_H$ or first group. In one or more embodiments, the HeNBs in the $P_L$ or second group perform or implement time domain ICIC with the HeNBs in the $P_H$ or first group. In one or more embodiments, the specific type of ICIC (e.g., time domain) is added to serve HeNBs in the $P_L$ or second group. In one or more embodiments, the HeNBs in the $P_L$ or second group perform or implement a type of ICIC (e.g., time domain) different from that performed or implemented among the HeNBs in the $P_H$ or first group. In one or more embodiments, the HeNBs in the $P_H$ group can support both types of ICIC.

Referring again to FIG. 2A, and by way of illustration, the small cells operate on a first frequency Freq1, and the macro cell 106 operates on a second frequency Freq2, in one or more embodiments. In one or more embodiments, the HeNBs in the $P_H$ group perform frequency domain ICIC. In one or more embodiments, the HeNBs in the $P_L$ group perform time domain ICIC with the HeNBs from the $P_H$ group, and therefore minimizes or avoids interference with one or more HeNBs in the $P_H$ group. In one or more embodiments, in a HetNet scenario, small cells operating at a first set of power levels perform time domain ICIC with small cells operating at a second set of power levels different from the first set. In one or more embodiments, small cells operating within a same power level (or set of power levels) perform frequency domain ICIC with each other.

Figure 2B:
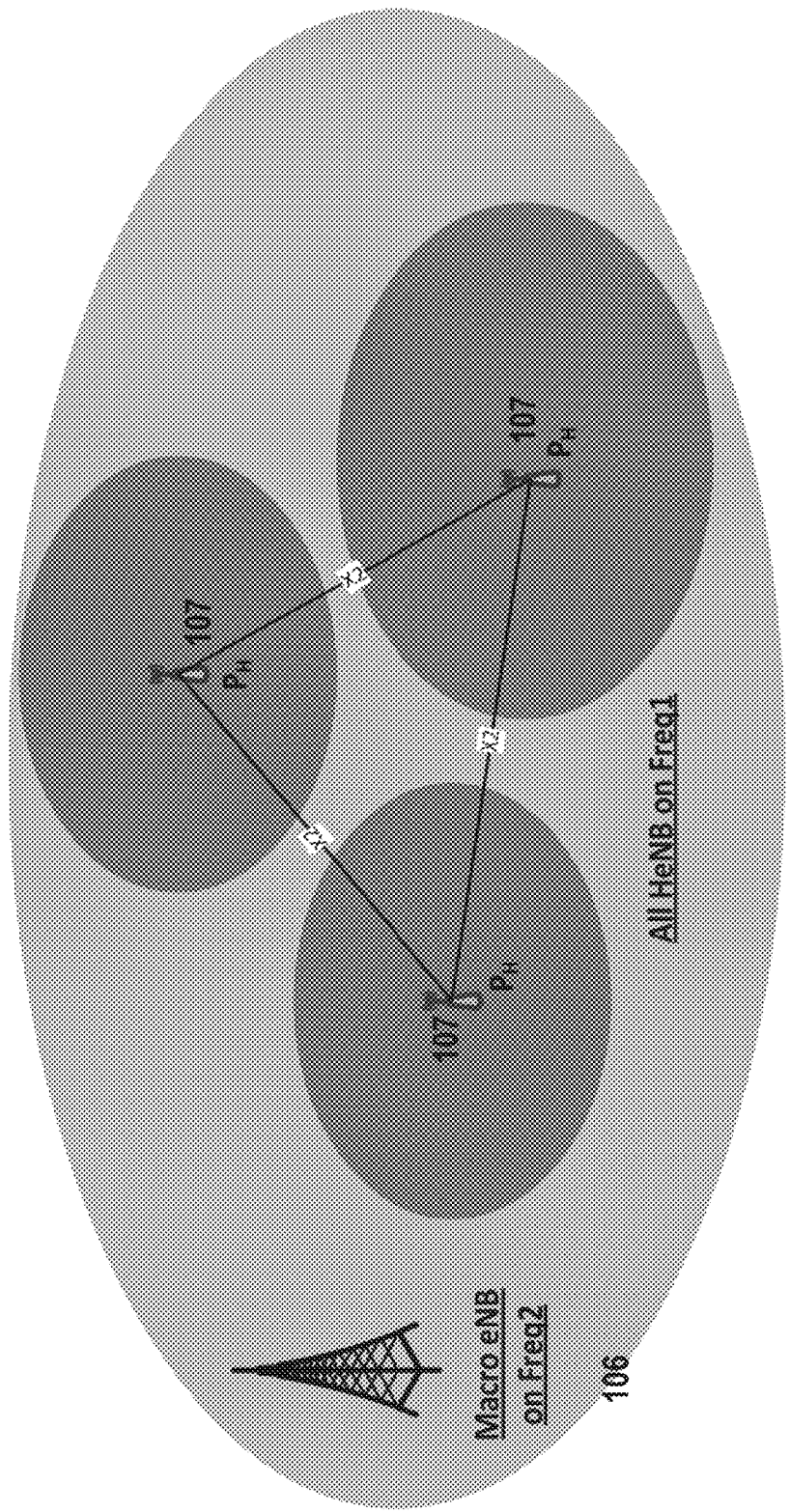
FIG. 2B is a diagram depicting another embodiment of a system for dense small cell deployment.
Figure 2C:
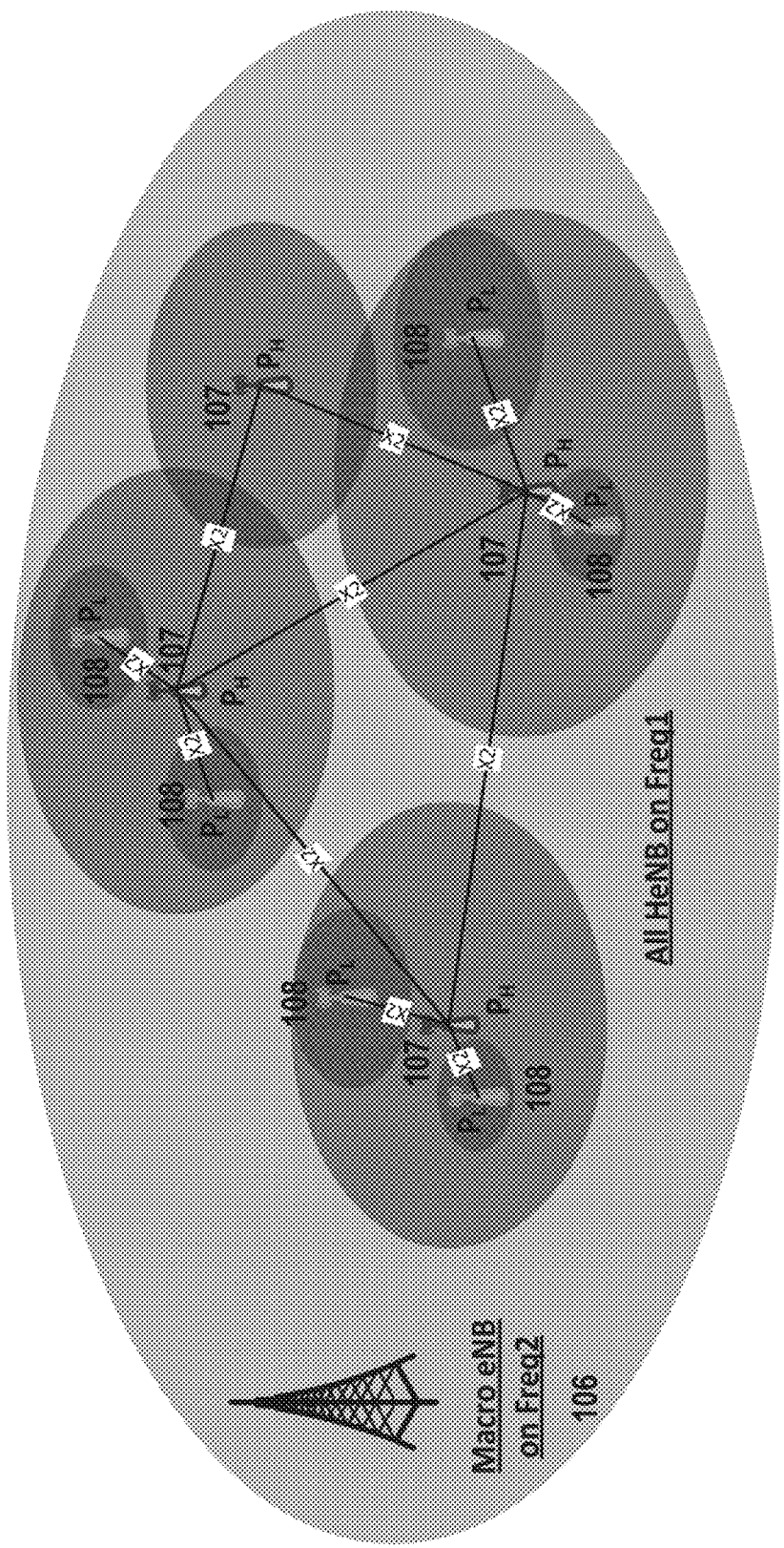
FIG. 2C is a block diagram depicting an embodiment of a system for dense small cell deployment.

In one or more embodiments, a deployment of HeNBs (e.g., associated with a macro cell 106) has the HeNBs select the power level(s) $P_H$, for example as depicted in FIG. 2B. In one or more embodiments, one or more HeNBs 108 are deployed (with power level(s) $P_L$ selected) in the vicinity of a first HeNB 107 in the $P_H$ group. In one or more embodiments, one or more HeNBs 108 are deployed or added (with power level(s) $P_L$ selected) in the vicinity of one or more HeNBs 107 in the $P_H$ group, for example as depicted in FIG. 2C. In one or more embodiments, FIG. 2B depicts an initial deployment of a first group of small cells. In one or more embodiments, FIG. 2C depicts a follow-on or further deployment of additional small cells (e.g., a second group of small cells) to boost capacity (e.g., in hotspots with high user demand), for example as an evolution from the initial deployment depicted in FIG. 2B. Such progressive or incremental deployment in stages or phases, enables smooth introduction of additional small cells and/or new features into the cellular network, in one or more embodiments. Deployment in stages or phases provide for the use of simple TPM algorithms in the initial stage, especially if $P_H$ and/or $P_L$ each contain a single power level or value, in one or more embodiments. In one or more embodiments, such a deployment methodology allows for simplification and/or robustness of network optimization functions, such as ICIC (both frequency and time domain), mobility robustness optimization (e.g., including handover and cell (re)selection), mobility load balancing, and random access channel (RACH) optimization.

Figure 2D:
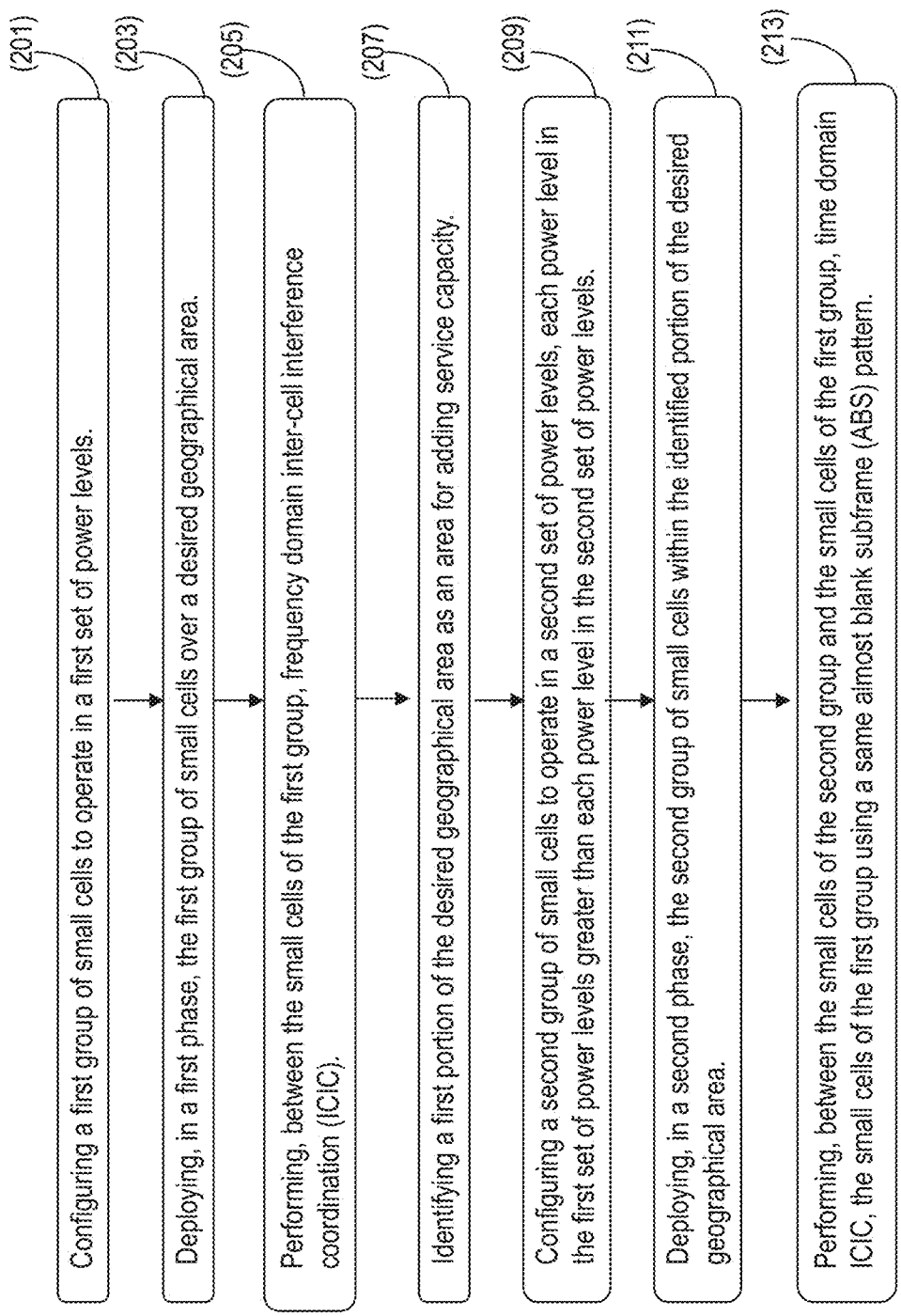
FIG. 2D is a flow diagram of an embodiment of a method for dense small cell deployment.

Referring now to FIG. 2D, one embodiment of a method for dense small cell deployment is depicted. The method includes configuring a first group of small cells to operate in a first set of power levels (operation 201). The first group of small cells is deployed, in a first phase, over a desired geographical area in one or more embodiments (operation 203), as part of a communication network. The small cells of the first group performs frequency domain ICIC between themselves, in one or more embodiments (operation 205). The communication network identifies a first portion of the desired geographical area as an area for adding service capacity in one or more embodiments (operation 207). A second group of small cells operates in a second set of power levels in one or more embodiments (operation 209). In one or more embodiments, each power level in the first set of power levels is greater than each power level in the second set of power levels. The second group of small cells is deployed, in a second phase, within the identified portion of the desired geographical area, in one or more embodiments (operation 211). The small cells of the second group performs time domain ICIC with the small cells in the first group, in one or more embodiments (operation 213). In one or more embodiments, the small cells of the first group uses a same ABS pattern.

Referring now to operation 201, and in some embodiments, the method includes configuring a first group of small cells to operate in a first set of power levels. The first group of small cells is identified and/or implemented for deployment over a defined or desired geographical area, in one or more embodiments. In one or more embodiments, the network service provider groups a plurality of small cells into a first group of small cells having a first set of power levels and a second group of small cells having a second set of power levels, in one or more embodiments. By way of illustration, a network service provider determines a number of small cells for the first group and/or the second group according to, or based at least in part on, a size of the geographical area and/or an expected service capacity, in one or more embodiments. The network service provider determines the type of small cells to use (e.g., in each group) according to the size of the geographical area and/or the expected service capacity in one or more embodiments.

In one or more embodiments, the network service provider selects or identifies a power level for a small cell to operate in. In one or more embodiments, power level selection follows one or more TPM algorithms employed or adopted by the network service provider. In one or more embodiments, power level selection is in accordance with the use of TPM algorithms in a self-organizing network. In one or more embodiments, the one or more TPM algorithms set a maximum transmit power of a small cell based on the small cell's radio environment, coverage requirements and/or mobility optimization criteria. In one or more embodiments, power level selection for small cells in the first group is performed in relation to power level selection for small cells in another group. In one or more embodiments, a small cell adopts, selects, negotiates for, or is implemented/assigned with a power level.

Referring now to operation 203, and in some embodiments, the first group of small cells is deployed, in a first phase, over a desired geographical area, in one or more embodiments as part of a communication network. In some embodiments, the first group of small cells is deployed, in a first phase of a plurality of phases for deployment of a plurality of small cells. In one or more embodiments, an initial stage of the deployment deploys small cells operating at power level(s) in $P_H$. The initial stage deploys small cells distributed across the desired geographical area to provide coverage over the desired geographical area, in one or more embodiments. In one or more embodiments, one or more subsequent stages of the deployment deploy another group of small cells operating at power level(s) in $P_L$. For example, a subsequent stage deploys additional small cells (e.g., of lower power levels relative to that of the first group) over one or more portions (e.g., hotspots) of the desired geographical area to provide additional capacity.

In one or more embodiments, the first group of small cells is selected, setup and/or deployed in association with one or more macro cells. In one or more embodiments, the network service provider deploys a macro cell to operate over at least a portion of the desired geographical area. In one or more embodiments, the network service provider deploys the macro cell to operate on a carrier frequency different from that of small cells (e.g., the first group of small cells) operating in a same area and/or a neighboring area. For instance, the small cells operate on a first frequency Freq1, and the macro cell operates on a second frequency Freq2, in one or more embodiments. This deployment strategy avoids or reduces interference, e.g., between signal communications of the macro cell and that of small cells, in one or more embodiments. In one or more embodiments, coverage, mobility and/or load balancing is managed between a macro cell and/or one or more small cells.

Referring now to operation 205, and in some embodiments, the small cells of the first group performs ICIC (e.g., frequency domain ICIC) between themselves, in one or more embodiments. One or more small cells of the first group perform reduction of interference created by neighbor cells (e.g., in the first group), in one or more embodiments. In one or more embodiments, the small cells employ and/or establish a connection or interface, such as an X2-interface available between the small cells to support ICIC. In one or more embodiments, small cells operating within a same power level (or set of power levels) perform frequency domain ICIC with each other. In one or more embodiments, the small cells perform the ICIC as part of the deployment. In one or more embodiments, the ICIC is performed in the first or initial phase of the deployment.

Referring now to operation 207, and in some embodiments, the communications network identifies a first portion of the desired geographical area as an area for adding service capacity in one or more embodiments. In one or more embodiments, the network service provider determines, identifies and/or projects that one or more portions of the desired geographical area have or is expected to have increased service demand or service load. In one or more embodiments, the network service provider makes the determination using, or based on feedback from one or more small cells in the first group, and/or one or more macro cells.

In one or more embodiments, the one or more small cells in the first group detect and/or report service demand levels in one or more portions of the geographical area. In one or more embodiments, the one or more small cells in the first group detect and/or report insufficient coverage and/or capacity in one or more portions of the geographical area. The communication network and/or network service provider determines or identifies one or more hotspots where additional capacity (e.g., from small cells) would be helpful or desirable, e.g., based on feedback and/or reports from the small cells.

Referring now to operation 209, and in some embodiments, the network service provider configures a second group of small cells to operate in a second set of power levels (e.g., $P_L$). In one or more embodiments, the second group of small cells operates in a second set of power levels relative to the first set of power levels (e.g., $P_H$). In one or more embodiments, the power levels in the $P_H$ and $P_L$ sets are specified or determined via TPM algorithms, or via other means. In one or more embodiments, each power level in the first set of power levels is greater than each power level in the second set of power levels. In one or more embodiments, the communications network and/or network service provider configures the first set of power levels to be separated from the second set of power levels by at least a specific amount, e.g., by at least 20 dB. For example, and in one or more embodiments, the difference between the minimum value/level in $P_H$ (e.g., 25, 20, 18, 15, 10 dBm) and the maximum value/level in $P_L$ (e.g., -15, -7, 0, 5 dBm) is significant or large (e.g., >20 dB, >10 dB, >30 dB, etc.).

In one or more embodiments, the network service provider configures the second group of small cells according to one or more identified hotspots where additional capacity (e.g., from small cells) would be helpful or desirable. In one or more embodiments, the second group of small cells are setup in accordance with one or more aspects described above in connection with operation 201. In one or more embodiments, power selection for a small cell of the second group is performed in accordance with one or more aspects described above in connection with operation 201.

Referring now to operation 211, and in some embodiments, the second group of small cells is deployed, in a second phase, within the identified portion of the desired geographical area, in one or more embodiments. In one or more embodiments, the network service provider deploys the second group of small cells in one or more portions or hotspots within the desired geographical area. In one or more embodiments, the network service provider deploys the second group of small cells in a second phase after the first phase. In one or more embodiments, one or more small cells are deployed to operate within the second set of power levels $P_L$ in the vicinity of a first small cell in the $P_H$ or first group. In one or more embodiments, one or more small cells of the second group are deployed or added in the vicinity of one or more small cells in the $P_H$ or first group. In one or more embodiments, one or more of the small cells in the second group are deployed according to one or more aspects described above in connection with operation 203.

Referring now to operation 213, and in some embodiments, the small cells of the second group performs ICIC (e.g., time domain ICIC) with the small cells in the first group, in one or more embodiments. In one or more embodiments, the small cells of the first group use a same ABS pattern. In one or more embodiments, the small cells in the $P_L$ group perform time domain ICIC with the small cells from the $P_H$ group, and therefore minimizes or avoids interference with one or more small cells in the $P_H$ group. In one or more embodiments, the first group of small cells and the second group of small cells operate simultaneously in a wireless network, resulting in a HetNet scenario. In one or more embodiments, the network service provider and/or communication network configures the small cells of the second group and the small cells in the first group to perform time domain ICIC with, to handle or address the HetNet scenario.

In some embodiments, one or more or all of the small cells in the $P_H$ or first group utilize a same ABS pattern in order to support small cells from the $P_L$ or second group located in-between small cells from the $P_H$ or first group. In this case, a small cell from the $P_L$ or second group sees interference from both the small cells from the $P_H$ or first group, and from small cells from the $P_L$ or second group, in one or more embodiments. In one or more embodiments, using a same ABS pattern distinguishes communications from small cells of the first group with other communications, such as communications from small cells of the second group. In utilizing the same ABS pattern, a small cell from the second group experiences reduced interference from small cells in the first group, in one or more embodiments.

In one or more embodiments, the ICIC is performed according to one or more aspects described above in connection with operation 205. In one or more embodiments, the time domain ICIC is performed as part of the second phase of the deployment. The second phase of deployment, as well as any additional phases, is carried out as needed (e.g., for coverage or for capacity). Such progressive or incremental deployment in stages or phases, enables smooth introduction of additional small cells and/or new features into the cellular network, in one or more embodiments. Deployment in stages or phases provide for the use of simple TPM algorithms in the initial stage, especially if $P_H$ and/or $P_L$ each contain a single power level or value, in one or more embodiments. In one or more embodiments, such a deployment methodology allows for simplification and/or robustness of network optimization functions, such as ICIC (both frequency and time domain), mobility robustness optimization (e.g., including handover and cell (re)selection), mobility load balancing, and random access channel (RACH) optimization.

In one or more embodiments, the network service provider deploys a third group of small cells over a second portion or hotspot of the desired geographical area. In one or more embodiments, the network service provider deploys a third group of small cells based on a change in the communication network (e.g., based on detection of a hotspot or insufficient capacity). In one or more embodiments, the third group of small cells operates within the second set of power levels. The third group of small cells is deployed concurrent with, as part of, or independent to the deployment of the second group, in one or more embodiments. In one or more embodiments, the network service provider deploys the third group of small cells over a second portion of the desired geographical area after deploying the first and second groups of small cells. In some embodiments, the second group of small cells do not interfere with the first group of small cells, e.g., due to geographical separation and/or other reasons. In some embodiments, the second group of small cells and the third group of small cells perform interference reduction (e.g., ICIC) with one another.

In some aspects, the present disclosure is directed to dense small cell deployment optimization. The present methods and systems provide improved coverage and/or capacity between two or more densely deployed small cells, in one or more embodiments. In one or more embodiments, two or more small cells are placed or located in close proximity in various scenarios, within a same building for example. For instance, and in one or more embodiments, two small cells are deployed on the same floor or horizontal plane of a building, separated by a wall (e.g., in separate rooms). For a deployment of two small cells on different floors, two small cells are placed in close proximity, substantially vertically relative to one another (e.g., in two apartment rooms belonging to two tenants, separated by a corresponding floor/ceiling). Depending on wall/floor attenuation, one of the small cells is set at very low transmit power while the other one is at full or higher power, according to current power control schemes employed in the small cells, in one or more embodiments. Such disproportionate operating power defeats the purpose of deploying a second small cell and results in no significant added coverage and capacity improvement by the second small cell, in one or more embodiments. In addition, this complicates implementation of mobility algorithms such as handoff and cell reselection, as the two cells are transmitting at different power levels, in one or more embodiments.

In one or more embodiments, a sniffer function of a first small cell is able to identify or detect one or more other small cells closely-deployed to the first small cell. The sniffer function is implemented in hardware, or a combination of hardware and software, of the first small cell in one or more embodiments. For instance, a sniffer includes or uses a downlink receiver that measures a signal strength from one or more neighboring small cells, in one or more embodiments. In some embodiments, small cell transmit power control algorithms use this measurement to determine a corresponding small cell's transmit power. In one or more embodiments, a small cell avoids creating pilot pollution by selecting a smaller power level for itself when a neighboring cell operating at a high power level is observed or detected.

In one or more embodiments, the present systems and methods provide for potential user intervention or interaction, or automatic adjustment while a small cell is installed or setup for operation in the proximity of another small cell. By way of illustration, and in one or more embodiments, a small cell is implemented to include or use a performance tuning component or tool. In one or more embodiments, the performance tuning component includes one or more application programs that execute on a computer and/or the small cell. The performance tuning component detects or determines power levels of one or more neighboring small cells, in one or more embodiments. The performance tuning component reports detected power levels of one or more neighboring small cells, to a person installing or configuring the small cell for example, in one or more embodiments. In an autonomous scenario, the performance tuning component communicates detected power levels of one or more neighboring small cells, and/or communicates instructions to a small cell capable of repositioning itself, in one or more embodiments. For example, a small cell requests for, and receives instructions and/or detected power levels from the performance tuning component, in one or more embodiments. In one or more embodiments, a small cell that hosts the performance tuning component is able to reposition itself, or provides feedback to a user or installation device to reposition the small cell. In one or more embodiments, the performance tuning component reports or suggests that an alternate location for the small cell is preferred due to strong neighboring cells. In one or more embodiments, the small cell is moved or relocated to a different location and an updated report is generated on detected power levels of one or more neighboring small cells.

In one or more embodiments, this process can be repeated or concluded as appropriate, e.g., using a feedback loop and/or optimization mechanism. This placement adjustment methodology improves coverage and transmit power configuration among multiple small cells, and is able to account for placement constraints (e.g., wiring limitations or physical obstructions) in one or more embodiments. In one or more embodiments, this placement adjustment methodology is used in the placement of a small cell given an existing (e.g., fixed) placement configuration of one or more other small cells. In one or more embodiments, this placement adjustment methodology is used in the placement of multiple small cells relative to each other.

Figure 2E:
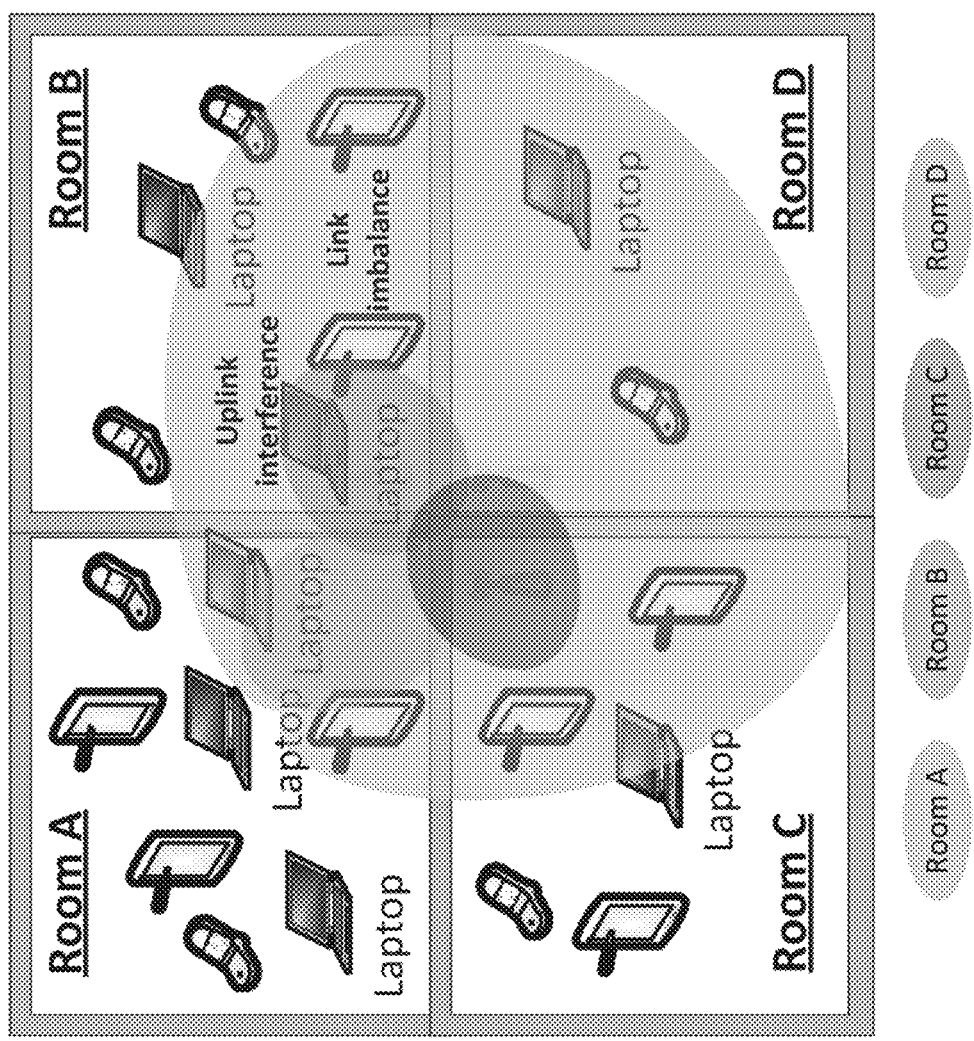
FIG. 2E depicts an example embodiment of power settings for a plurality of small cells.

FIG. 2E depicts an example embodiment of power settings for a plurality of small cells. Four small cells are shown by way of illustration, in a dense deployment scenario. For example, the small cells are placed in close proximity to each other across four rooms. Such a dense deployment is due to wiring limitations in the room to the backhaul for example, in one or more embodiments. Based on transmit power algorithms in the small cells, one possible transmit power setup could be that the small cell in room D operates at a highest power level (e.g. 20 dBm) while small cells located in the other three rooms operate at a lower power level (e.g. −7 dBm) in one or more embodiments. This scenario is possible, for example if the small cell in room D is installed, set up and/or configured before the other small cells in one or more embodiments. The later installed or configured small cells would detect a strong power level from the small cell in room D, and configure themselves to operate at a low power level in one or more embodiments. FIG. 2E illustrates one embodiment of the resulting coverage map.

In one or more embodiments, one or more of the following problems are created with such power settings: (a) load imbalance: multiple users (e.g., in Rooms A-C) are connected to the small cell in room D (e.g., due to a higher power and/or better coverage), although the other small cells are operating in the other rooms; (b) poor coverage and throughput for users who expect better experience in rooms A-C with their small cells installed; (c) link imbalance for cells with overlapping coverage: an example is a tablet in room B is connected to the small cell in room D due to better downlink signal quality from the small cell in room D, but uplink transmission is determined to be better via the connection to the small cell in room B, and increased uplink transmit power causes interference to an adjacent laptop connected to small cell in room B; or (d) an increase in interference coordination, mobility and load balancing optimization complexity: because the cells are transmitting at different power levels, handover and load balancing algorithms have to take these into consideration.

Figure 2F:
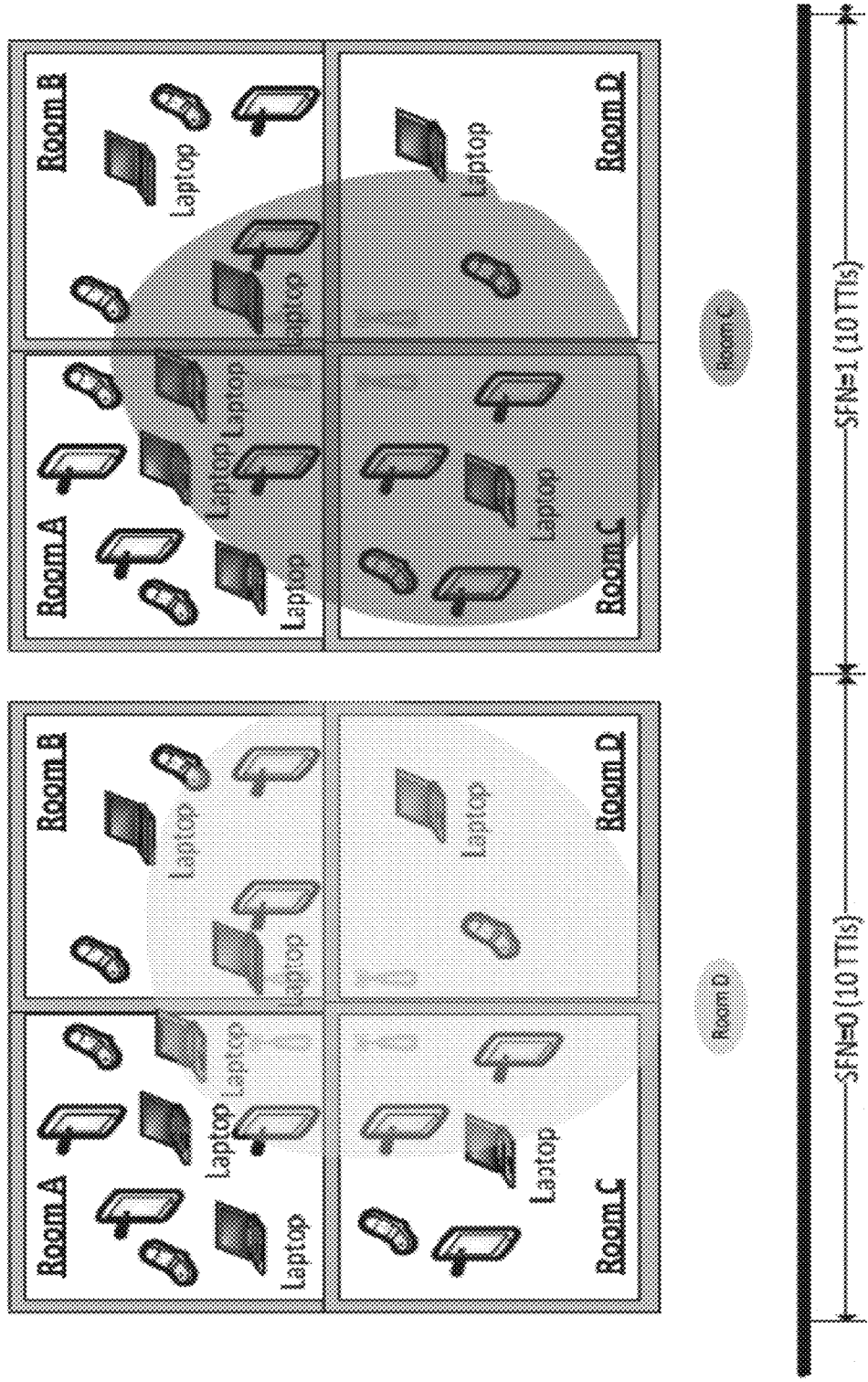
FIGS. 2F and 2G depict an example embodiment of a transmit power configuration for a plurality of small cells over time.
Figure 2G:
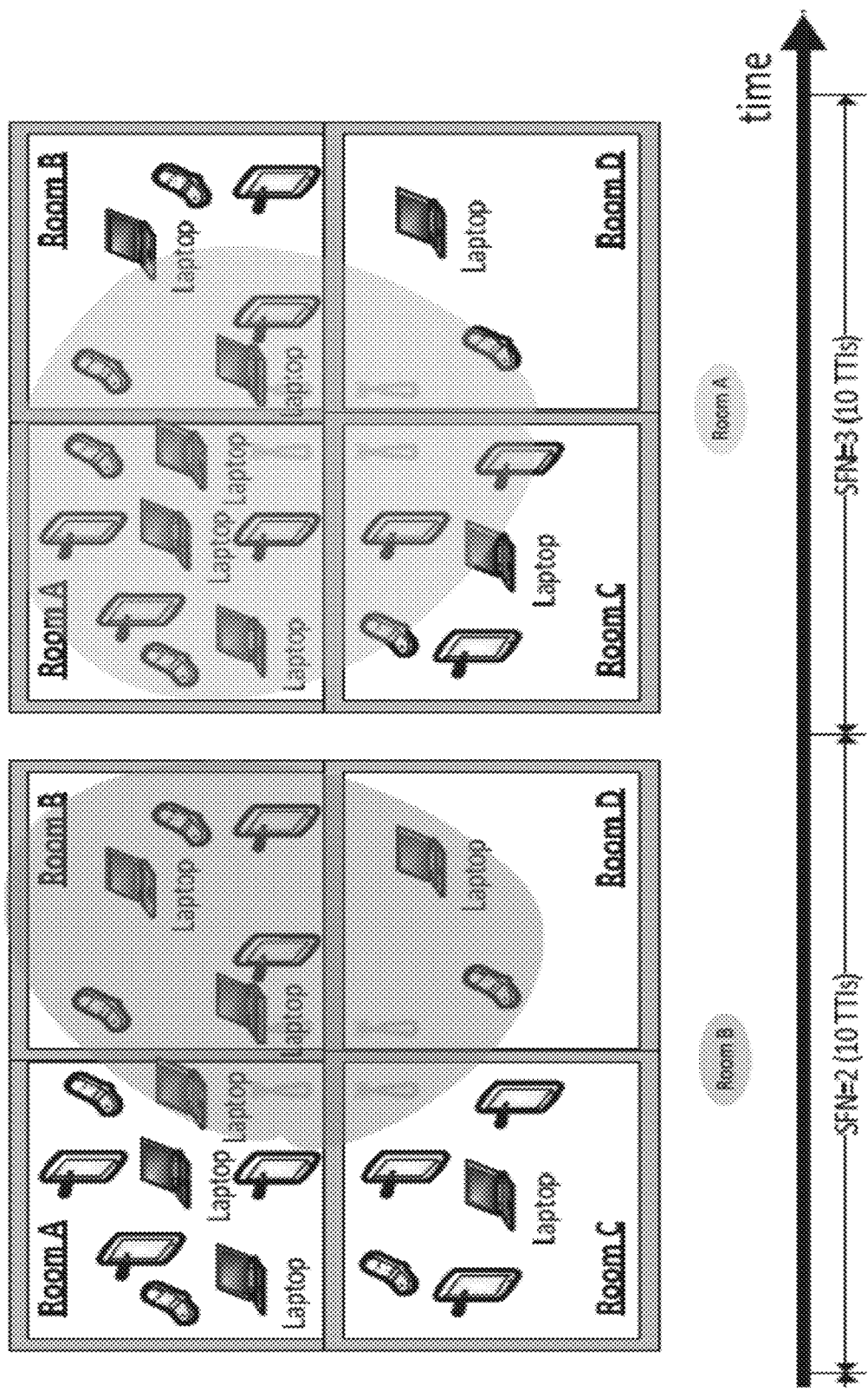

In one or more embodiments, the present systems and methods provides that a plurality of small cells each transmits at a predetermined or same power level within a deployment region. FIGS. 2F and 2G depict an example embodiment of a transmit power configuration for a plurality of small cells over time. For instance, the small cells are setup to transmit at the same power in one or more embodiments. In one or more embodiments, a user or coordinating entity configures the small cells to transmit at a predefined power level. In some embodiments, each of the small cells is setup to transmit at its maximum power level. In some embodiments, each of the small cells is setup to transmit at a respective power level to provide coverage over a same geographical region. The small cells are setup according to a centralized SON (cSON), e.g., via a centralized unit or device overseeing configuration or coordination between the small cells, in one or more embodiments. In one or more embodiments, the small cells are setup according to a distributed SON (dSON), or a hybrid between a dSON and a cSON.

In one or more embodiments, the plurality of small cells performs time division transmission and reception. In one or more embodiments, a user or coordinating entity (e.g., a cSON function or component) configures the small cells to operate in a time division multiplexing manner. Each of the plurality of small cells performs transmission and reception within a non-overlapping time period predefined for the respective small cell, in one or more embodiments. Each of the plurality of small cells performs transmission and reception in turn, according to a predefined sequence for example, in or more embodiments. For instance, time-division transmission is established with a predetermined repetition pattern (e.g., a 40 ms repetition pattern), with an equal time interval of transmission for each small cell, in one or more embodiments. As such, the operation of each of the small cells does not interfere with that of other small cells, in one or more embodiments.

By way of illustration, FIGS. 2F and 2G depict the same physical deployment of four small cells in four rooms as in FIG. 2E, with time division between the small cells implemented as shown in FIGS. 2F and 2G. The time division between the small cells is implemented or supported via time domain ICIC for example (e.g., consistent with 3GPP standards), in one or more embodiments. A time division pattern or configuration for the small cells is optimized by one or more SON functions or mechanisms, in one or more embodiments. The time division pattern or configuration is reused across small cell clusters corresponding to or using a same or similar deployment configuration, in one or more embodiments. In one or more embodiments, the small cells perform frequency domain ICIC, if possible and applicable, between clusters of these small cells.

In one or more embodiments, a device (e.g., UE) communicating with a small cell is designed, adapted and/or implemented to detect, determine, or be informed of the time division pattern or scheduling. In one or more embodiments, a device communicating with a small cell is designed, adapted and/or implemented to detect, determine, or be informed of when the corresponding small cell (e.g., of the same room) is transmitting and/or receiving (e.g., on), or not transmitting and/or receiving (e.g., off). The device determines when to access that small cell based on the detection and/or the time division pattern, in one or more embodiments.

In one or more embodiments, such an operational configuration between small cells allows for a simplified transmit power configuration among a plurality of densely deployed small cells. In one or more embodiments, this simplifies certain network optimization functions, such as ICIC (both frequency and time domain), mobility robustness optimization (e.g., including handover and cell (re)selection), mobility load balancing, and random access channel (RACH) optimization. For instance, for use in handover between small cells, a single parameter setting for threshold power could be relied on instead of multiple threshold values across small cells, in one or more embodiments. Because each of the small cell can transmit at the same (e.g., maximum) predefined power when on, a single setting for threshold power is possible, in one or more embodiments. In one or more embodiments, transmitting at full transmit power helps provide energy savings because a radio frequency amplifier (RF PA) of a small cell operates more efficiently at full transmit power during the time it is operating.

In one or more embodiments, the small cells are deployed using the placement adjustment methodology described earlier. Improving small cell location (e.g., via the placement adjustment methodology) is helpful in improving the overall operation between the small cells, as time division transmission reduces average cell throughput (e.g., as compared with not implementing time division transmission, in the case where there is no interference between small cells that are concurrently transmitting), in one or more embodiments. Small cells that are set up to be located further apart (e.g., via the placement adjustment methodology) from one another allow for an improved time division transmission pattern, in one or more embodiments.

Although certain examples of communications systems described above can include devices operating according to a 3GPP or LTE standard, it should be understood that embodiments of the systems and methods described can operate according to other standards and use wireless communications devices other than devices implemented as devices and base stations. For example, communication interfaces associated with cellular networks, satellite communications, vehicle communication networks, 802.11 and other non-802.11 wireless networks can utilize the systems and methods described herein to achieve improved overall capacity and/or link quality without departing from the scope of the systems and methods described herein.

It should be noted that certain passages of this disclosure can reference terms such as "first" and "second" in connection with devices, signals, communication protocols, etc., for purposes of identifying or differentiating one from another or from others. These terms are not intended to merely relate entities (e.g., a first signal and a second signal) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for small cell deployment, the method comprising:
   grouping a plurality of small cells into a first group of small cells having a first set of power levels and a second group of small cells having a second set of power levels, each power level of the first set of power levels greater than each power level of the second set of power levels;
   performing, between the small cells of the first group, frequency domain inter-cell interference coordination (ICIC); and
   performing, between the small cells of the second group and the small cells of the first group, time domain ICIC, the small cells of the first group using a same almost blank subframe (ABS) pattern.

2. The method of claim 1, further comprising deploying the first group of small cells in a first phase, and deploying the second group of small cells in a second phase occurring after the first phase.

3. The method of claim 1, further comprising deploying the first group of small cells distributed over a desired geographical area, and deploying the second group of small cells within an identified portion of the desired geographical area.

4. The method of claim 3, further comprising identifying the first portion of the desired geographical area as an area for adding service capacity.

5. The method of claim 3, further comprising deploying a third group of small cells over a second portion of the desired geographical area, the third group of small cells configured to operate within the second set of power levels.

6. The method of claim 3, further comprising deploying a third group of small cells over a second portion of the desired geographical area after deploying the first and second groups of small cells.

7. The method of claim 1, further comprising deploying a macro cell to operate over at least a portion of the desired geographical area, and to operate on a carrier frequency different from that of the first group of small cells.

8. The method of claim 1, further comprising configuring the first set of power levels to be separated from the second set of power levels by at least 20 dB.

9. A system for small cell deployment, the system comprising:
   a first group of small cells having a first set of power levels; and
   a second group of small cells having a second set of power levels, each power level of the first set of power levels greater than each power level of the second set of power levels;
   wherein small cells of the first group are configured to perform frequency domain inter-cell interference coordination (ICIC) between the small cells of the first group, and
   wherein small cells of the second group are configured to perform time domain ICIC with the small cells of the first group, the small cells of the first group using a same almost blank subframe (ABS) pattern.

10. The system of claim 9, wherein the first group of small cells is configured to be deployed in a first phase, and the second group of small cells is configured to be deployed in a second phase.

11. The system of claim 9, wherein the first group of small cells is configured to be deployed and distributed over a desired geographical area, and the second group of small cells is configured to be deployed within an identified portion of the desired geographical area.

12. The system of claim 11, wherein the first portion of the desired geographical area is identified as an area for adding service capacity.

13. The system of claim 11, further comprising a third group of small cells configured to be deployed over a second portion of the desired geographical area, and configured to operate within the second set of power levels.

14. The system of claim 11, further comprising a third group of small cells configured to be deployed over a second portion of the desired geographical area after deploying the first and second groups of small cells.

15. The system of claim 9, further comprising a macro cell configured to operate over at least a portion of the desired geographical area, and to operate on a carrier frequency different from that of the first group of small cells.

16. The system of claim 9, wherein the first set of power levels is separated from the second set of power levels by at least 20 dB.

17. A method for small cell deployment, the method comprising:
   deploying a first group of small cells over a desired geographical area, the first group of small cells configured to operate within a first set of power levels;
   performing, between the small cells of the first group, frequency domain inter-cell interference coordination (ICIC);
   deploying a second group of small cells within a first portion of the desired geographical area, the second group of small cells configured to operate within a second set of power levels, each power level in the first set of power levels greater than each power level in the second set of power levels; and
   performing, between the small cells of the second group and the small cells of the first group, time domain ICIC, the small cells of the first group using a same almost blank subframe (ABS) pattern.

18. The method of claim 17, further comprising identifying the first portion of the desired geographical area as an area for adding service capacity.

19. The method of claim 17, further comprising deploying a third group of small cells over a second portion of the desired geographical area, the third group of small cells configured to operate within the second set of power levels.

20. The method of claim 17, further comprising configuring the first set of power levels to be separated from the second set of power levels by at least 20 dB.

* * * * *